US011145921B2

United States Patent
Larson et al.

(10) Patent No.: US 11,145,921 B2
(45) Date of Patent: Oct. 12, 2021

(54) VAPOR PHASE PHOTO-ELECTROCHEMICAL CELL

(71) Applicants: David M. Larson, San Francisco, CA (US); Karl A. Walczak, Albuquerque, NM (US)

(72) Inventors: David M. Larson, San Francisco, CA (US); Karl A. Walczak, Albuquerque, NM (US)

(73) Assignee: The Regents of the University of California, Oakland, CA (US)

(*) Notice: Subject to any disclaimer, the term of this patent is extended or adjusted under 35 U.S.C. 154(b) by 236 days.

(21) Appl. No.: 16/210,144

(22) Filed: Dec. 5, 2018

(65) Prior Publication Data
US 2019/0181521 A1   Jun. 13, 2019

Related U.S. Application Data

(60) Provisional application No. 62/597,581, filed on Dec. 12, 2017.

(51) Int. Cl.
| | | |
|---|---|---|
| *H01M 14/00* | (2006.01) | |
| *C25B 1/04* | (2021.01) | |
| *C25B 1/55* | (2021.01) | |
| *H01M 50/531* | (2021.01) | |

(52) U.S. Cl.
CPC ............ *H01M 14/005* (2013.01); *C25B 1/04* (2013.01); *C25B 1/55* (2021.01); *H01M 50/531* (2021.01)

(58) Field of Classification Search
None
See application file for complete search history.

(56) References Cited

U.S. PATENT DOCUMENTS

| | | | |
|---|---|---|---|
| 7,094,326 B2* | 8/2006 | Crocker | G01N 27/30 204/280 |
| 7,132,191 B2 | 11/2006 | Healy et al. | |
| 7,459,487 B2 | 12/2008 | Liu et al. | |
| 8,568,619 B2* | 10/2013 | Yamanaka | H01B 1/22 252/514 |
| 8,828,613 B2 | 9/2014 | Zhang et al. | |
| 8,981,206 B2* | 3/2015 | Goldstein | H01G 9/2077 136/251 |
| 9,478,743 B2 | 10/2016 | Lee et al. | |
| 2006/0081816 A1 | 4/2006 | Brabec et al. | |

(Continued)

OTHER PUBLICATIONS

Hu et al., "Thin-Film Materials for the Protection of Semiconducting Photoelectrodes in Solar-Fuel Generators." J. Phys. Chem. C vol. 119, No. 43, pp. 24201-24228 (2015).

(Continued)

*Primary Examiner* — Sarah A. Slifka

(57) ABSTRACT

This disclosure provides systems, methods, and apparatus related to a vapor phase photo-electrochemical cell. In one aspect, a device includes a photovoltaic cell, a cathode disposed on the photovoltaic cell, an ionomer membrane disposed on the cathode, and an anode disposed on the ionomer membrane. The cathode includes a cathode catalyst. The ionomer membrane is in contact with the cathode catalyst. The anode includes an anode catalyst. The anode catalyst is in contact with the ionomer membrane. The anode, the ionomer membrane, and the cathode are transmissive to the solar radiation spectrum.

16 Claims, 7 Drawing Sheets

(56) References Cited

U.S. PATENT DOCUMENTS

| | | |
|---|---|---|
| 2008/0145732 A1 | 6/2008 | Tavares et al. |
| 2010/0159298 A1 | 6/2010 | Haug |
| 2011/0117454 A1 | 5/2011 | Winther-Jensen et al. |
| 2013/0092549 A1 | 4/2013 | Spurgeon et al. |
| 2014/0227634 A1* | 8/2014 | Gulla ................. H01M 4/8896 429/530 |
| 2015/0125594 A1 | 5/2015 | Haug |
| 2016/0064672 A1 | 3/2016 | Lee et al. |

OTHER PUBLICATIONS

Modestino et al. "Vapor-fed microfluidic hydrogen generator." Lab Chip. vol. 15, pp. 2287-2296 (2015).

Xiang et al., "Modeling an integrated photoelectrolysis system sustained by water vapor." Energy and Environmental Science. vol. 6, pp. 3713-3721 (2013).

Singh et al, "Design of Membrane-Encapsulated Wireless Photoelectrochemical Cells for Hydrogen Production." The Journal of the Electrochemical Society. vol. 161, No. 8, pp. E3283-E3296 (2014).

\* cited by examiner

VAPOR PHASE PHOTO-ELECTROCHEMICAL CELL

RELATED APPLICATIONS

This application claims priority to U.S. Provisional Patent Application No. 62/597,581, filed Dec. 12, 2017, which is herein incorporated by reference.

STATEMENT OF GOVERNMENT SUPPORT

This invention was made with government support under Contract Nos. DE-AC02-05CH11231 and DE-SC0004993 awarded by the U.S. Department of Energy. The government has certain rights in this invention.

TECHNICAL FIELD

This disclosure relates generally to photo-electrochemical cells and more particularly to vapor phase photo-electrochemical cells.

BACKGROUND

The mission of the Joint Center for Artificial Photosynthesis (JCAP) is to advance research and development of materials and systems that convert sunlight, water, and carbon dioxide into chemical fuels. JCAP hopes to revolutionize the energy generation industry by advancing fundamental understanding, discovering and developing materials, sub-systems, and technologies, for solar fuel generation. Desired attributes of a solar fuel generator are that it efficiently, effectively, and reliably, captures and converts solar energy into chemical ready fuels. Commercialization aspects consider economic, environment, and social feasibilities.

The current state of the art photo-electrochemical device operates at extreme pH (e.g., pH of about 1 or about 13) to increase electrolyte conductivity and to decrease overall cell resistance. This introduces corrosion problems that lead to reduced stability. Membranes are used to separate chemicals and conduct ions between electrolytic half cells. The use of membranes has led to interface issues and problems associated with design complexity.

SUMMARY

One innovative aspect of the subject matter described in this disclosure can be implemented in a device including a photovoltaic cell, a cathode disposed on the photovoltaic cell, an ionomer membrane disposed on the cathode, and an anode disposed on the ionomer membrane. The cathode includes a cathode catalyst. The ionomer membrane is in contact with the cathode catalyst. The anode includes an anode catalyst. The anode catalyst is in contact with the ionomer membrane. The anode, the ionomer membrane, and the cathode are transmissive to the solar radiation spectrum.

Another innovative aspect of the subject matter described in this disclosure can be implemented in a device including a cathode comprising a gas diffusion electrode, an ionomer membrane disposed on the cathode, and an anode disposed on the ionomer membrane. The cathode has a cathode catalyst disposed thereon and a photoactive material disposed thereon. The cathode catalyst and the photoactive material are a single material. The ionomer membrane is in contact with the single material. The anode includes an anode catalyst. The anode catalyst is in contact with the ionomer membrane. The anode and the ionomer membrane are transmissive to the solar radiation spectrum.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 85% of the targeted value, within 90% of the targeted value, within 95% of the targeted value, or within 99% of the targeted value.

Figure 1:
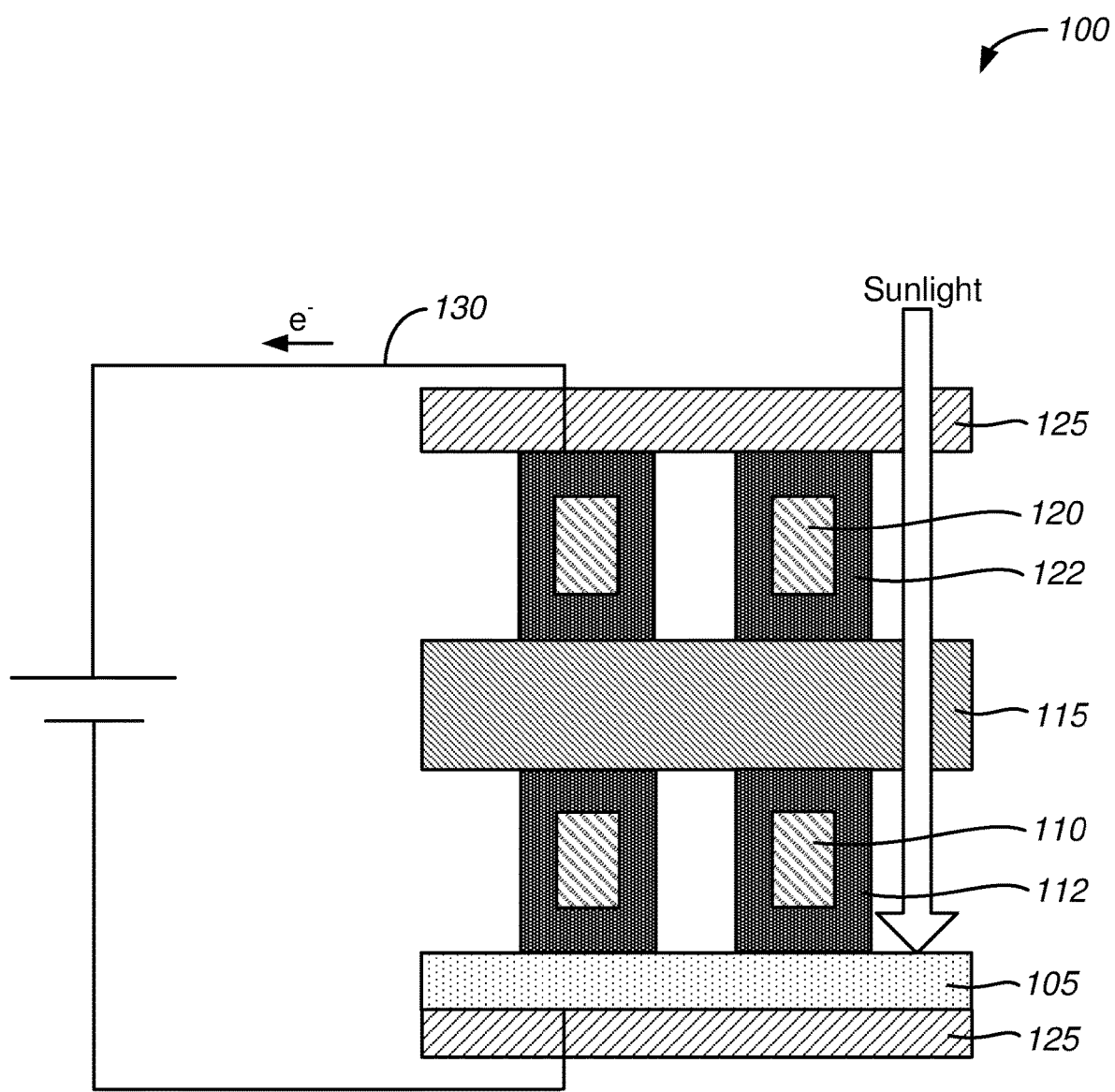
FIG. 1 shows an example a cross-sectional schematic illustration of a photo-electrochemical cell.

FIG. 1 shows an example a cross-sectional schematic illustration of a photo-electrochemical cell. As shown in FIG. 1, the photo-electrochemical cell 100 includes a photovoltaic cell 105, a cathode 110 disposed on the photovoltaic cell, an ionomer membrane 115 disposed on the cathode, and an anode 120 disposed on the ionomer membrane 115. An electrical connection 130 is between the anode 120 and the photovoltaic cell 105. The anode 120, the ionomer membrane 115, and the cathode 110 are transmissive to the solar radiation spectrum. For example, these components may transmit 90% or more of the incident sunlight to the photovoltaic cell 105. This allows for sunlight to irradiate the photovoltaic cell 105 and generate electricity.

The cathode 110 is electrically conductive. The cathode 110 includes a cathode catalyst 112. The cathode catalyst 112 is in contact with the ionomer membrane 115. In some embodiments, the cathode catalyst 112 is disposed on the cathode 110. The cathode 110 is in electrical contact with the photovoltaic cell 105. The photovoltaic cell 105 supplies the potential and current that drives the electrochemical reaction in the photoelectrochemical cell 100.

The anode 120 is electrically conductive. The anode 120 includes an anode catalyst 122. The anode catalyst 122 is in contact with the ionomer membrane 115. In some embodiments, the anode catalyst 122 is disposed on the anode 120.

The photo-electrochemical cell 100 replaces liquid electrolytes used in other photo-electrochemical cells with the ionomer membrane 115. The cathode catalyst 112 and the anode catalyst 122 are in direct contact with the ionomer membrane 115. When the photo-electrochemical cell 100 is in operation, the ionomer membrane 115 is operable to transport ions between the anode 120 and the cathode 110. In some embodiments, when the photo-electrochemical cell 100 is in operation, there is no liquid or semiliquid electrolyte in the photo-electrochemical cell 100 that transports ions. That is, no liquid or semiliquid electrolyte in the photo-electrochemical cell 100 serves as a conductive pathway. The ionomer membrane 115 serves to keep the products separated from the anode to avoid re-oxidation. The ionomer membrane 115 also maintains the balance of ions to avoid polarization losses and charge gradients.

In some embodiments, the photovoltaic cell 105 comprises a triple junction photovoltaic cell. In some embodiments, the triple junction photovoltaic cell includes semiconductors selected from a group consisting of InGaP, GaAs, Ge, and InGaAs. The photovoltaic cell may generate a potential of about 2.5 V and a current of about 13 mA.

In some embodiments, the photovoltaic cell 105, the cathode 110, the ionomer membrane 115, and the anode 120 are disposed in a frame 125. The frame 125 may provide support for the components of the photo-electrochemical cell 100. For example, the photovoltaic cell 105 and the anode 120 may be in contact with the frame 125. In some embodiments, the frame 125 is fabricated from an acrylic or a glass. In some embodiments, the frame is transparent or substantially transparent to the solar radiation spectrum. In some embodiments, the frame forms enclosed compartments with ports or openings for gas flow in and out for the cathode 110 and the anode 120. For example, the frame may form a compartment for the cathode 110, with a gas flow in and gas flow out such that gas flows past the cathode 110. The frame may also form a similar type of compartment for the anode 120.

The photo-electrochemical cell 100 may be used for water splitting/hydrogen gas generation or carbon dioxide reduction, for example. In each case, different cathode catalysts 112, ionomer membranes 115, and anode catalysts 122 may be used.

The embodiment of the photo-electrochemical cell 100 described below may be used for water splitting/hydrogen gas generation. In some embodiments, the cathode 110 comprises an electrically conductive metal. In some embodiments, the cathode 110 comprises a plurality of conductive wires. In some embodiments, the cathode catalyst 112 is disposed on the plurality of conductive wires. For example, the plurality of conductive wires may comprise titanium wires or tantalum wires. In some embodiments, the plurality of conductive wires is selected from a group consisting of a plurality of titanium wires and a plurality of tantalum wires. In some embodiments, the cathode catalyst 112 comprises platinum.

In some embodiments, wires of the plurality of wires may have a rectangular or a square cross-section. In some embodiments, the wires are about 100 microns to 200 microns thick, or about 150 microns, thick. In some embodiments, the wires are about 50 microns to 150 microns wide, or about 100 microns wide. In some embodiments, the wires are spaced about 0.5 millimeters (mm) to 1.5 mm, or about 1 mm apart. The small width and the large spacing of the wires is to allow sunlight to irradiate the photovoltaic cell 105.

In some embodiments, the ionomer membrane 115 comprises a sulfonated tetrafluoroethylene based fluoropolymer-copolymer (e.g., Nafion from E. I. du Pont de Nemours and Company, Wilmington, Del.). The ionomer membrane is able to conduct protons ($H^+$).

In some embodiments, the anode 120 comprises an electrically conductive metal. In some embodiments, the anode 120 comprises a plurality of conductive wires. In some embodiments, the anode catalyst 122 is disposed on the plurality of conductive wires. For example, the plurality of conductive wires may comprise titanium wires or tantalum wires. In some embodiments, the plurality of conductive wires is selected from a group consisting of a plurality of titanium wires and a plurality of tantalum wires. In some embodiments, the anode catalyst 122 comprises nickel, ruthenium, iridium, platinum, or a nickel-iron alloy. In some embodiments, the anode catalyst 122 is selected from a group consisting of nickel, ruthenium, iridium, platinum, and a nickel-iron alloy In some embodiments, wires of the plurality of wires may have a rectangular or a square cross-section. In some embodiments, the wires are about 100 microns to 200 microns thick, or about 150 microns, thick. In some embodiments, the wires are about 50 microns to 150 microns wide, or about 100 microns wide. In some embodiments, the wires are spaced about 0.5 mm to 1.5 mm, or about 1 mm apart. The small width and the large spacing of the wires is to allow sunlight to irradiate the photovoltaic cell 105. Widths of the cathode wires and the anode wires and the spacing between the cathode wires and the anode wires can be adjusted so that the photovoltaic cell is irradiated with sufficient sunlight for the specified reaction to occur and so that there is sufficient surface area at the anode and the cathode for the specified reactions to occur.

Figure 2:
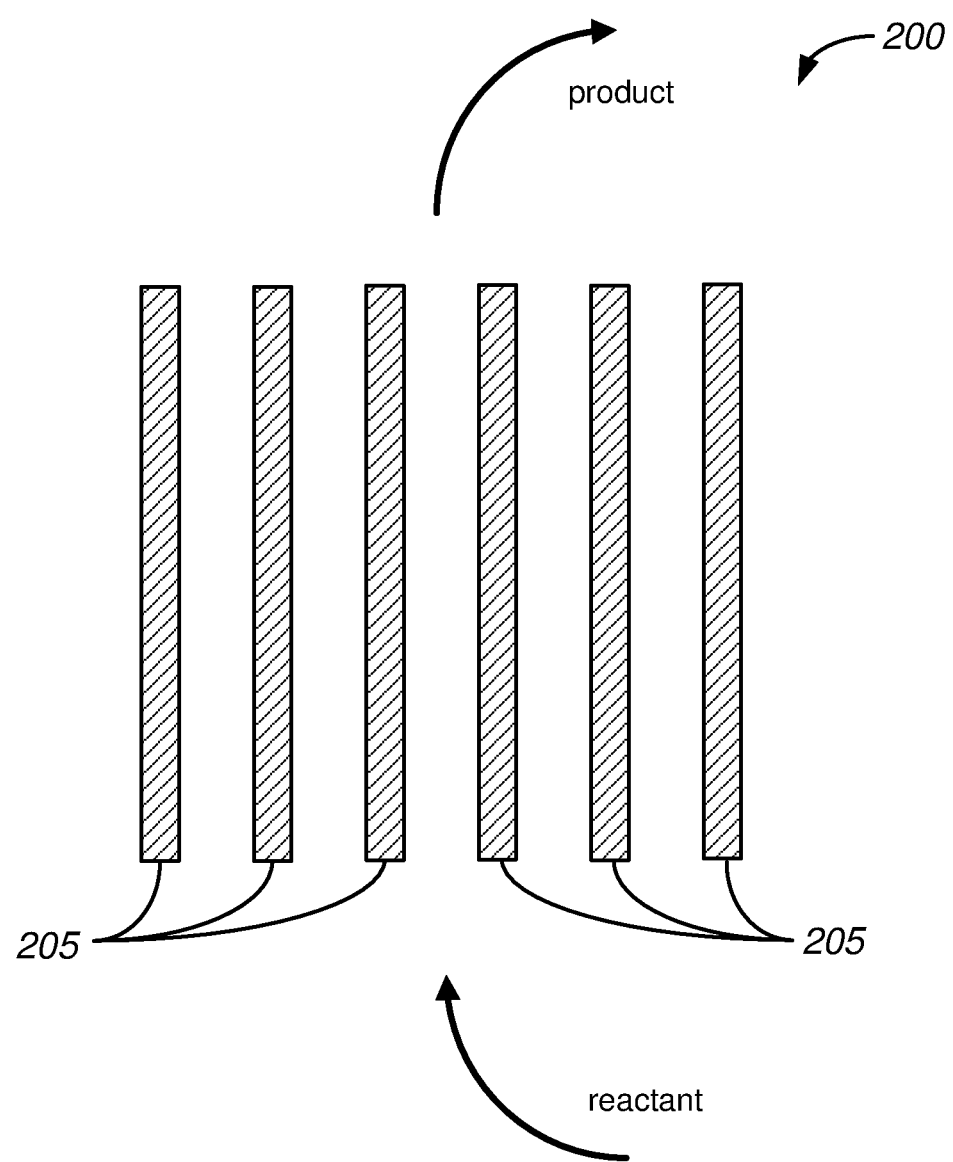
FIG. 2 shows an example of a top-down schematic illustration of an electrode.

FIG. 2 shows an example of a top-down schematic illustration of an electrode. As shown in FIG. 2, the electrode 200 comprises a plurality of wires 205. The electrode 200 may function as either the cathode 110 or the anode 120.

Figure 3:
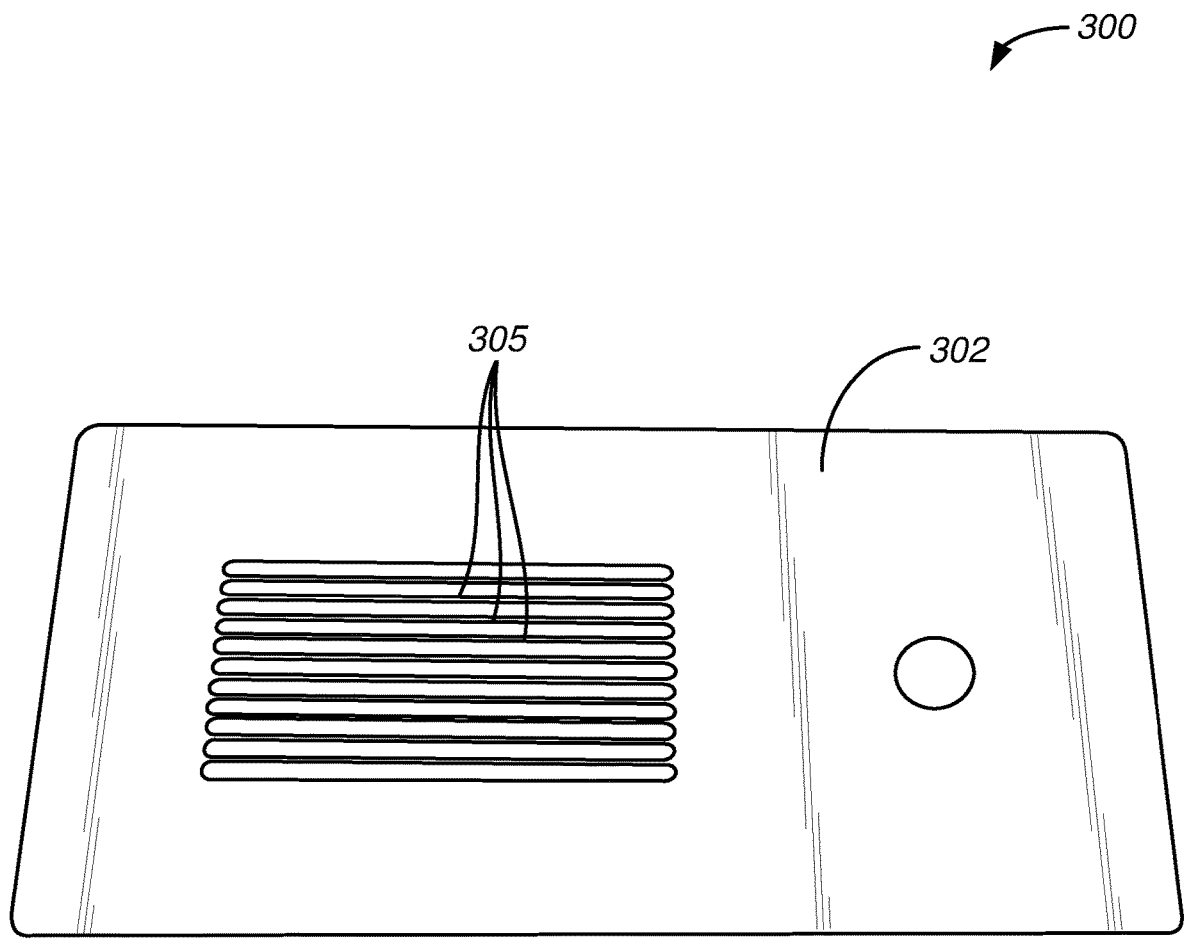
FIG. 3 shows an example of a schematic illustration of an electrode.

FIG. 3 shows an example of a schematic illustration of an electrode. As shown in FIG. 3, the electrode 300 comprises a sheet of metal 302. The sheet of metal 302 defines a plurality of wires 305. The wires 305 may be fabricated by cutting openings in the sheet of metal 302. For example, the wires 305 may be cut with a laser. The sheet of metal 302 at the ends of the wires 305 may keep the wires 305 aligned and facilitate fabrication of a photo-electrochemical cell. A photo-electrochemical cell could be fabricated such that the wires are part of the internal, active component of the cell and the remainder of sheet of metal is part of the external support structure of the photo-electrochemical cell. A catalyst may be sputtered or electroplated onto the wires 305. In some embodiments, an anode catalyst or cathode catalyst disposed on the anode or the cathode, respectively, has a thickness of about 50 nanometers (nm) to 100 nm, or about 150 nm.

Returning to FIG. 1, when the photo-electrochemical cell 100 is in operation, water vapor (e.g., gas at about 90% to 100% relative humidity) may be supplied to the anode 120. For example, water vapor may be supplied to the photo-electrochemical cell 100 by bubbling an inert gas (e.g., nitrogen) through water and then inputting the gas stream to the photo-electrochemical cell 100. For the photo-electrochemical cell 100 shown in FIG. 1, water vapor would flow into the photo-electrochemical cell 100 perpendicular to the page, along the anode 120, and then out of the photo-electrochemical cell 100 perpendicular to the page. An oxidation reaction occurs at the anode 120. Water is split into oxygen molecules, hydrogen ions, and electrons. The electrons flow to the photovoltaic cell 105. The hydrogen ions (i.e., protons) flow though the ionomer membrane 105. A reduction reaction occurs at the cathode 110. At the cathode 110, the hydrogen ions and the electrons combine to generate hydrogen gas. Nitrogen, argon, or another inert gas may be flowed into a chamber containing the cathode 110 to facilitate the collection of the hydrogen gas. For the photo-electrochemical cell 100 shown in FIG. 1, hydrogen gas would flow into the page of the device 100 or out of the page of the device 100 past the cathode 110. When the cathode 110 comprises wires and when the anode 120 comprises wires, the wires also serve as a guide for gasses (i.e., the input feedstock and the produced product chemical(s)) flowing through the photo-electrochemical cell 100.

Several functions are served by the electrodes (i.e., the cathode 110 and the anode 120) when the electrodes comprise a plurality of wires. For example, the plurality of wires serves as a current collector, a catalyst substrate (i.e., for the cathode catalyst 112 and for the anode catalyst 122), and a gas flow field. The catalysts disposed on the electrode are in direct contact with the ionomer membrane 115, removing the need of a liquid electrolyte in the photo-electrochemical cell 100. This allows the photo-electrochemical cell 100 to operate in a water vapor fed configuration in which there is no liquid water acting as an electrolyte in the device.

The reactions (i.e., the water splitting and the hydrogen gas formation) occur at the junction between the ionomer membranes and the respective catalysts. Thus, instead of the wires comprising the cathode 110 and the anode 120 being entirely coated with the respective catalysts as shown in FIG. 1, the respective catalysts could only be disposed on the cathode 110 surface and the anode 120 surface in contact with the ionomer membrane 115.

Further, the cathode 110 and the anode 120 could be fabricated entirely out of the cathode catalyst 112 and the anode catalyst 122, respectively. The catalyst materials are generally expensive, however, which is the reason for coating the cathode 110 and the anode 120 with the cathode catalyst 112 and the anode catalyst 122, respectively.

Water uptake by the ionomer membrane and ionomer membrane hydration are important in the operation of the photo-electrochemical cell 100. For example, low ionomer membrane hydration may limit the allowable current for a stable device. In addition to maintaining a specified ionomer membrane hydration, avoiding contact between the hydrated ionomer membrane and any catalytically active materials (e.g., additional metal components associated with the photo-electrochemical cell 100) beyond the desired reaction is beneficial. The ionomer membrane acts as the electrolyte, and contact with other active materials will affect efficiency and performance. Electrode catalyst (i.e., cathode catalyst and anode catalyst) and ionomer membrane contact also is important to the proper functioning (i.e., optimal performance which minimizes losses) of the photo-electrochemical cell 100.

In some embodiments, a polymer layer disposed on the electrodes can improve ion conductivity, improve water uptake, and increase the active area of the catalyst. In some embodiments, the polymer layer comprises a polymer monomer of the ionomer membrane (e.g., a sulfonated tetrafluoroethylene based fluoropolymer-copolymer). In some embodiments, the polymer layer is deposited on the electrodes by applying an ionomer emulsion to the electrodes. In some embodiments, the ionomer emulsion comprises a liquid emulsion of the ionomer membrane polymer monomer (e.g., a 5% sulfonated tetrafluoroethylene based fluoropolymer-copolymer emulsion in methanol). The polymer layer may extend the "reach" of the ionomer membrane to places that are not in direct contact with the ionomer membrane itself. In some embodiments, a polymer additive (e.g., a polytetrafluoroethylene suspension) is applied to the anode to tune the water vapor interaction with the surface of the anode. In some embodiments, the polymer layer includes other modifiers, such as carbon black (e.g., as a microporous layer), for example.

The configuration of the photo-electrochemical cell 100 addresses a number of the challenges associated with liquid electrolyte photoelectrochemistry, including low electrolyte conductivity, product separation, bubble management, corrosion, and device complexity. Replacing the liquid electrolyte in a photo-electrochemical cell with an ionomer membrane allows for reducing the IR drop due to electrolyte resistance, shortening the ion path length, reducing corrosion potential, and avoiding freezing in cold environments. Using wire electrodes and eliminating the liquid electrolyte allows for reducing parasitic light absorption and reflection, including the photovoltaic cell or other light absorber in the stack, and controlling the electric field, the current density, the flow field, and the size and shape of the catalytic areas.

Further advantages of the configuration of the photo-electrochemical cell 100 include:
- gas/vapor phase input;
- multiphase input feeds feasible in both the anode and the cathode;
- minimization of system losses by minimizing the ionic path length and the cell resistance (e.g., from a liquid electrolyte); and
- the ability to incorporate commercial photovoltaic cells into the photo-electrochemical cell.

An embodiment of the photo-electrochemical cell 100 could be used for carbon dioxide reduction. The photo-electrochemical cell 100 could be used for carbon dioxide reduction when for example, the cathode catalyst comprises copper, silver, or gold and the ionomer membrane comprises an anion exchange membrane. Further cathode catalysts that may be used are listed in Hori Y (2008) Electrochemical CO2 Reduction on Metal Electrodes. Modern Aspects of Electrochemistry (Springer, New York), pp 89-189, which is herein incorporated by reference.

In some embodiments of the photo-electrochemical cell 100, the photo-electrochemical cell does not include a photovoltaic cell. In such embodiments, the catalyst and light absorber components are integrated. For example, a light absorbing material may be disposed on an electrode surface. This may be accomplished, for example, by co-depositing or collocating the catalyst and light absorber to minimize the ion/electron pathway. It is possible, for example, to combine $TiO_2$ particles and $Cu_2O$ particles in solution and evolve gas by illuminating the particles with light. In this case, the $TiO_2$ particles absorb light and the $Cu_2O$ particles then use the separated charges to complete a reaction. Integrating the catalyst and light absorber components may allow for reducing contact resistance, reducing the need for additionally protective coatings on the light absorber, minimizing or eliminating the effects of product gas bubbles that form on or near a photoelectrode, and reducing system weight and complexity.

Figure 4:
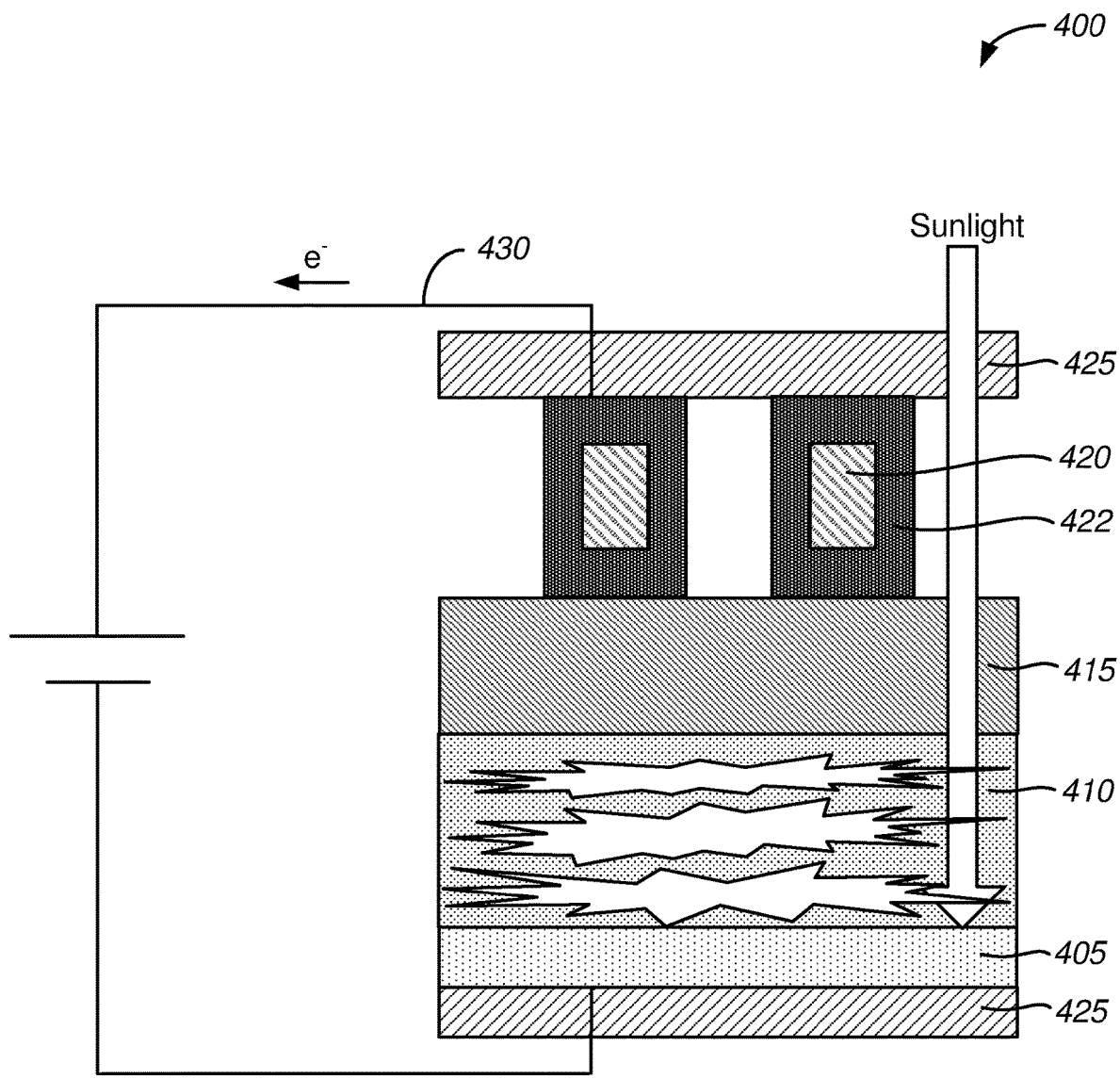
FIG. 4 shows an example a cross-sectional schematic illustration of a photo-electrochemical cell.

FIG. 4 shows an example a cross-sectional schematic illustration of a photo-electrochemical cell. Some components of the photo-electrochemical cell (PEC) 400 may be the same as or similar to the components of the PEC 100 shown in FIG. 1 (e.g., the photovoltaic cell 105, the anode 120, the anode catalyst 122, the frame 125).

As shown in FIG. 4, the PEC 400 includes a photovoltaic cell 405, a cathode 410 disposed on the photovoltaic cell 405, an ionomer membrane 415 disposed on the cathode, and an anode 420 disposed on the ionomer membrane 415. An electrical connection 430 is between the anode 420 and the photovoltaic cell 405. The anode 420, the ionomer membrane 415, and the cathode 410 are transmissive to the solar radiation spectrum. For example, these components may transmit 90% or more of the incident sunlight to the photovoltaic cell 405. This allows for sunlight to irradiate the photovoltaic cell 405 and generate electricity. In some embodiments, the photovoltaic cell 405, the cathode 410, the ionomer membrane 415, and the anode 420 are disposed in a frame 425. In some embodiments, the photovoltaic cell 405 comprises a triple junction photovoltaic cell.

When the photo-electrochemical cell 400 is in operation, the ionomer membrane 415 is operable to transport ions between the anode 420 and the cathode 410. In some embodiments, when the photo-electrochemical cell 400 is in operation, there is no liquid or semiliquid electrolyte in the photo-electrochemical cell 400 that transports ions. That is, no liquid or semiliquid electrolyte in the photo-electrochemical cell 400 serves as a conductive pathway.

The cathode 410 is electrically conductive. In some embodiments, the cathode 410 comprises a gas diffusion electrode. A gas diffusion electrode is an electrode comprising a conductive material that defines porosity or channels to allow a gas to flow though the electrode. The porosity or channels defined by a gas diffusion electrode may have be about nanometers or about microns in size. Gas diffusion electrodes also have a high surface area (e.g., the gas flowing through the electrode is exposed to a high surface area of the gas diffusion electrode). In some embodiments, the gas diffusion electrode is about 300 microns to 500 microns thick. In some embodiments, the gas diffusion electrode has a cathode catalyst (not shown) disposed thereon. In some embodiments, the cathode catalyst is in contact with the ionomer membrane 415. The cathode 410 is in electrical contact with the photovoltaic cell 405. The photovoltaic cell 405 supplies the potential and current that drives the electrochemical reaction of the PEC 400.

The anode 420 is electrically conductive. The anode 420 includes an anode catalyst 422. The anode catalyst 422 is in contact with the ionomer membrane 415. In some embodiments, the anode catalyst 422 is disposed on the cathode 420.

The PEC 400 may be used for water splitting/hydrogen gas generation or carbon dioxide reduction, for example. In each case, different cathode catalysts 412, ionomer membranes 415, and anode catalysts 422 may be used. The embodiment of the PEC 400 described below may be used for carbon dioxide reduction.

In some embodiments, the cathode 410 comprising a gas diffusion electrode comprises a glass frit. A glass frit is a glass assembly comprising particles of glass that are fused together. For example, the particles of glass may be fused with heat. A glass frit generally includes some porosity. The gas frit has porosity sufficient to allow for gas flow through the glass frit. In some embodiments, a conductive polymer is disposed on the glass frit. In some embodiments, the conductive polymer is ionically conductive and electrically conductive (e.g., PEDOT:PSS/sulfonated tetrafluoroethylene based fluoropolymer-copolymer). In some embodiments, the cathode catalyst is disposed on the conductive polymer. In some embodiments, the cathode catalyst is disposed on the conductive polymer on the glass frit on one side of the glass frit, the side of the glass frit in contact with ionomer membrane 415. The glass frit, the conductive polymer, and the cathode catalyst being disposed on one side of the glass frit is to help make that cathode 410 transparent to sunlight so that sunlight may be transmitted to the photovoltaic cell 405.

In some embodiments, the cathode catalyst 422 comprises copper (reduction of $CO_2$ to a number of different products), silver (reduction of $CO_2$ to CO), or gold (reduction of $CO_2$ to CO). In some embodiments, the cathode catalyst 422 is selected from a group consisting of copper, silver, and gold.

In some embodiments, the ionomer membrane 415 comprises an anion exchange membrane. The ionomer membrane 415 is operable to conduct anions, including hydroxide ions ($OH^-$), acetate ions, fluoride ions, chloride ions ($Cl^-$), and carbonate ions ($CO_3^{2-}$). For example, Selemion ion exchange membranes (AGC Chemicals, Chiba, Japan) may be used in the PEC 400.

In some embodiments, the anode 420 is electrically conductive. In some embodiments, the anode 420 comprises a plurality of conductive wires. In some embodiments, the anode catalyst 422 disposed on the plurality of conductive wires. For example, the plurality of conductive wires may comprise titanium wires or tantalum wires. In some embodiments, the plurality of conductive wires is selected from a group consisting of a plurality of titanium wires and a plurality of tantalum wires. In some embodiments, the anode catalyst 422 comprises nickel, ruthenium, iridium, platinum, or a nickel-iron alloy. In some embodiments, the anode catalyst 422 is selected from a group consisting of nickel, ruthenium, iridium, platinum, and a nickel-iron alloy.

In some embodiments, wires of the plurality of wires may have a rectangular or square cross-section. In some embodiments, the wires are about 100 microns to 200 microns thick, or about 150 microns, thick. In some embodiments, the wires are about 50 microns to 150 microns wide, or about 100 microns wide. In some embodiments, the wires are spaced about 0.5 mm to 1.5 mm, or about 1 mm apart.

When the PEC is in operation, water vapor (e.g., gas at about 90% to 100% relative humidity) is supplied to the anode 420. In some embodiments, the gas comprises an inert gas. An oxidation reaction occurs at the anode 420. Water is split into hydroxide ions, protons, and electrons. The electrons flow to the photovoltaic cell 405. Anions are conducted though the ionomer membrane 405. Carbon dioxide is supplied to the cathode 410. A reduction reaction occurs at the cathode 410.

The configuration of the PEC 400 addresses some limitations of carbon dioxide reduction PECs. The PEC 400 can overcome mass transport limitations inherent to $CO_2$ solubility (e.g., 33 mM at pH 6.8) in aqueous electrolyte PECs. The PEC 400 also allows for gas (i.e., gaseous $CO_2$) fed cathodic reactions.

An embodiment of the PEC 400 could be used for water splitting/hydrogen gas generation, for example, when the cathode catalyst comprises platinum or iron and the ionomer membrane is able to conduct protons (e.g., such as a sulfonated tetrafluoroethylene based fluoropolymer-copolymer).

Figure 5:
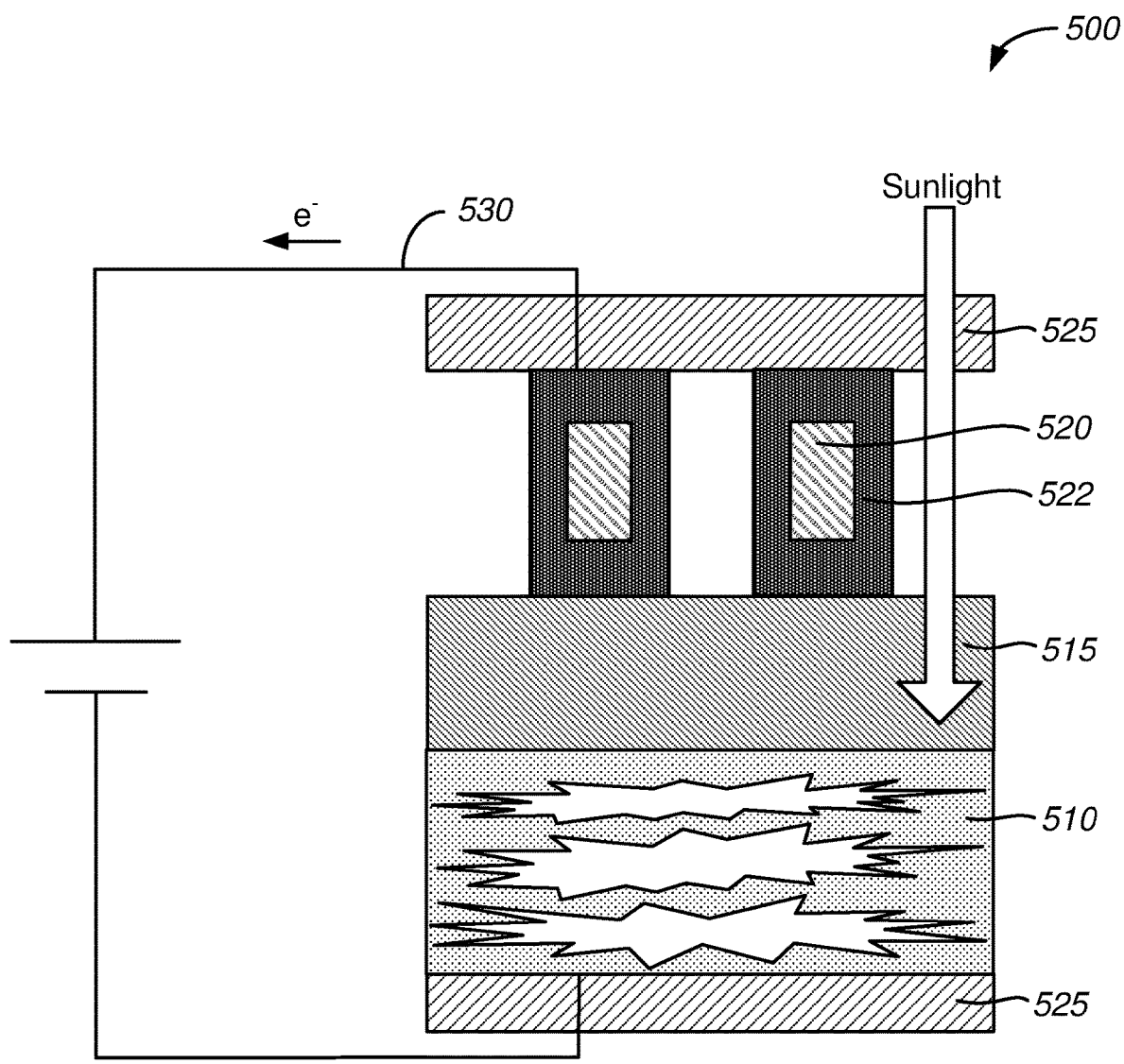
FIG. 5 shows an example a cross-sectional schematic illustration of a photo-electrochemical cell.

FIG. 5 shows an example a cross-sectional schematic illustration of a photo-electrochemical cell. Some components of the photo-electrochemical cell (PEC) 500 may be the same as or similar to the components of the PECs 100 and 400 shown in FIGS. 1 and 4, respectively (e.g., the ionomer membrane 415, the anode 120, the anode catalyst 122, the frame 125).

As shown in FIG. 5, the PEC 500 includes a cathode 510, an ionomer membrane 515 disposed on the cathode, and an anode 520 disposed on the ionomer membrane 515. An electrical connection 530 is between the anode 520 and the cathode 510. The anode 520 and the ionomer membrane 515 are transmissive to the solar radiation spectrum. For example, these components may transmit 90% or more of the incident sunlight to the cathode 510. This allows for sunlight to irradiate the cathode 510. In some embodiments, the cathode 510, the ionomer membrane 515, and the anode 520 are disposed in a frame 525.

When the photo-electrochemical cell 500 is in operation, the ionomer membrane 515 is operable to transport ions between the anode 520 and the cathode 510. In some embodiments, when the photo-electrochemical cell 500 is in operation, there is no liquid or semiliquid electrolyte in the photo-electrochemical cell 500 that transports ions. That is, no liquid or semiliquid electrolyte in the photo-electrochemical cell 500 serves as a conductive pathway.

The cathode 510 is electrically conductive. In some embodiments, the cathode 510 comprises a gas diffusion electrode. In some embodiments, the gas diffusion electrode is about 300 microns to 500 microns thick. In some embodiments, the gas diffusion electrode has a cathode catalyst (not shown) and a photoactive material (not shown) disposed thereon. In some embodiment, the cathode catalyst and the photoactive material are the same material. That is, a single material comprises or serves as the cathode catalyst and the photoactive material. In some embodiments, the single material is in contact with the ionomer membrane 515.

The anode 520 includes an anode catalyst 522. The anode catalyst 522 is in contact with the ionomer membrane 515. In some embodiments, the anode catalyst 522 is disposed on the cathode 520.

The PEC 500 may be used for water splitting/hydrogen gas generation or carbon dioxide reduction, for example. In each case, different cathode catalysts 512, ionomer membranes 515, and anode catalysts 522 may be used. The embodiment of the PEC 500 described below may be used for carbon dioxide reduction.

In some embodiments, the cathode 510 comprising a gas diffusion electrode comprises carbon paper. Carbon paper comprises carbon microfibers or other carbon particulate that are incorporated into a flat sheet (e.g., Toray carbon paper from Toray Industries, Inc., Tokyo, Japan). The carbon paper has porosity sufficient to allow for gas flow through the carbon paper. The carbon paper also is conductive. In some embodiments, the carbon paper does not include contamination that would alter the product distribution (e.g., iron contamination would increase the fraction of hydrogen created by giving an energetically more favorable pathway to hydrogen generation). Contaminants may be removed from the carbon paper by immersing the carbon paper in nitric acid. In some embodiments, the carbon paper further includes an additive such carbon black particles or a polymer coating. Such additives may set the environment for overall reactivity at the cathode 510. In some embodiments, the cathode catalyst material and the photoactive material (which are the same materials) disposed on the carbon paper comprises cuprous oxide ($Cu_2O$), titanium dioxide ($TiO_2$), and bismuth vanadate ($BiVO_4$).

In some embodiments, the ionomer membrane 515 comprises an anion exchange membrane. The ionomer membrane 515 is operable to conduct hydroxide ions ($OH^-$), acetate ions, fluorate ions, chloride ions ($Cl^-$), or carbonate ions ($CO_3^{2-}$).

In some embodiments, the anode 520 comprises an electrically conductive metal. In some embodiments, the anode 520 comprises a plurality of conductive wires. In some embodiments, the anode catalyst 522 disposed on the plurality of conductive wires. For example, the plurality of conductive wires may comprise titanium wires or tantalum wires. In some embodiments, the plurality of conductive wires is selected from a group consisting of a plurality of titanium wires and a plurality of tantalum wires. In some embodiments, the anode catalyst 522 comprises nickel, ruthenium, iridium, platinum, or a nickel-iron alloy. In some embodiments, the anode catalyst 522 is selected from a group consisting of nickel, ruthenium, iridium, platinum, and a nickel-iron alloy.

In some embodiments, operation of the PEC 500 is similar to operation of the PEC 400.

In the embodiments of the PEC 100, 400, and 500 described above, water vapor can be supplied to the anode. In some embodiments, liquid water can be supplied to the anode. Note that when liquid water is supplied to the anode, the liquid water is not serving as an electrolyte or a conductive pathway in the device. The liquid water is instead serving as a source for the water that is to be oxidized at the anode.

Figure 6:
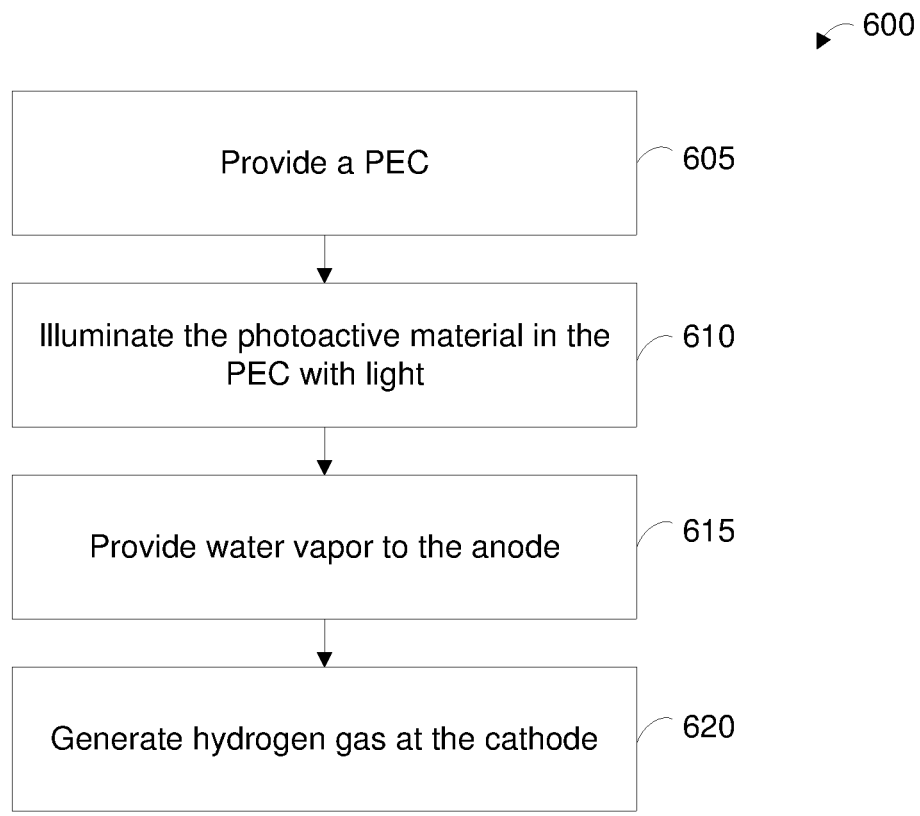
FIG. 6 shows an example of a flow diagram illustrating a method of use of a photo-electrochemical cell.

FIG. 6 shows an example of a flow diagram illustrating a method of use of a photo-electrochemical cell. Starting at block 605 of the method 600 shown in FIG. 6, a PEC is provided. Any of the PECs described herein could be provided.

At block 610, the photoactive material in the PEC is illuminated with light (e.g., sunlight). The photoactive material in the PECs 100 and 400 is the photovoltaic cell. The photoactive material in the PEC 500 is the material disposed on the cathode that serves as the cathode catalyst and the photoactive material. The photoactive material absorbs photons, creating electron-hole pairs.

At block 615, water vapor is provided to the anode. For example, water vapor could be provided to the anode by bubbling an inert gas (e.g., nitrogen) through water and providing that gas stream to the anode. At the anode, water is oxidized, generating oxygen gas ($O_2$) and hydrogen ions ($H^+$).

At block 620, hydrogen gas is generated at the cathode. The hydrogen ions generated at the anode by the water splitting are conducted through the ionomer membrane. At the cathode, the hydrogen ions are reduced with electrons provided by the water oxidation to form hydrogen gas ($H_2$). In some embodiments, an inert gas (e.g., nitrogen) is flowed past the cathode to aid in collecting the hydrogen.

Figure 7:
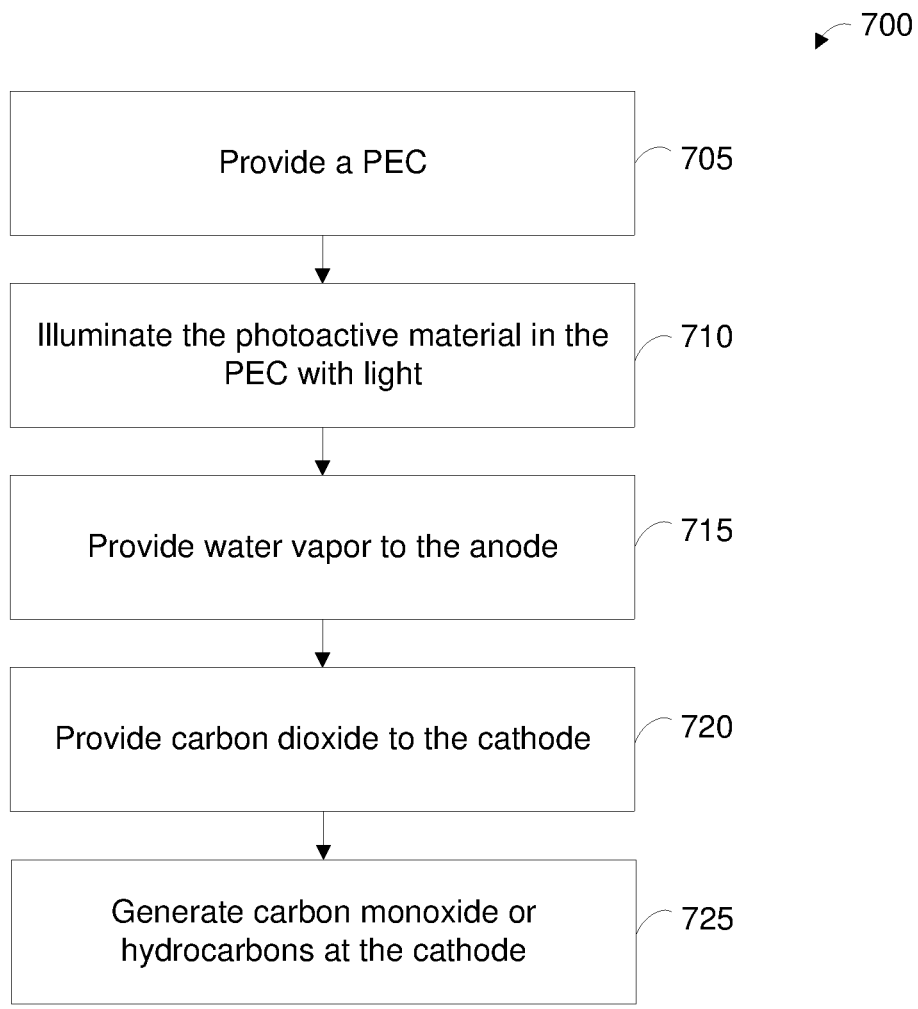
FIG. 7 shows an example of a flow diagram illustrating a method of use of a photo-electrochemical cell.

FIG. 7 shows an example of a flow diagram illustrating a method of use of a photo-electrochemical cell. Starting at block 705 of the method 700 shown in FIG. 7, a PEC is provided. Any of the PECs described herein could be provided.

At block 710, the photoactive material in the PEC is illuminated with light (e.g., sunlight). The photoactive material in the PECs 100 and 400 is the photovoltaic cell. The photoactive material in the PEC 500 is the material disposed on the cathode that serves as the cathode catalyst and the photoactive material. The photoactive material absorbs photons, creating electron-hole pairs.

At block 715, water vapor is provided to the anode. For example, water vapor could be provided to the anode by bubbling an inert gas (e.g., nitrogen) through water and providing that gas stream to the anode. At the anode, water is oxidized with, generating hydroxide ions ($OH^-$), hydrogen ions ($H^+$), and electrons.

At block 720, carbon dioxide is provided to the cathode.

At block 725, carbon monoxide or hydrocarbons are generated at the cathode. The carbon dioxide provided to the cathode is reduced to generate the carbon monoxide or the hydrocarbons.

EXAMPLE

The following examples are intended to be examples of the embodiments disclosed herein, and are not intended to be limiting.

An example PEC for water splitting/hydrogen gas generation was constructed and operated. This hydrogen-generating PEC was designed, fabricated, and tested using commercial available components and well characterized materials. The light absorber was a triple junction photovoltaic. The ionomer membrane was Nafion (Ion Power, New Castle, Del.). The catalysts were platinum for the hydrogen evolution reaction (HER) at the cathode and iridium oxide for the oxygen evolution reaction (OER) at the anode. Specifically, the anode catalyst was iridium-coated laser-etched tantalum micro-wire and the cathode catalyst was platinum-coated laser-etched tantalum micro-wire. The catalysts were deposited using physical vapor deposition, specifically radio frequency sputtering. The chassis/housing/frame to house components of the PEC were machined from acrylic.

When the hydrogen-generating PEC was operated, the anode was flushed with water to hydrate the ionomer membrane. The cathode was flushed with nitrogen to collect hydrogen and to measure the concentration of hydrogen. This hydrogen-generating PEC was shown to work with 10% solar to hydrogen efficiency, with liquid water in the anode chamber, and limited by the ~10 $mA/cm^2$ current density of the photovoltaic. Note that while liquid water, instead of water vapor, was used in the anode chamber, this liquid water is not serving as an electrolyte. The liquid water was supplying water that was oxidized.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
   a photovoltaic cell;
   a cathode disposed on the photovoltaic cell, the cathode including a cathode catalyst;
   an ionomer membrane disposed on the cathode, the ionomer membrane in contact with the cathode catalyst; and
   an anode disposed on the ionomer membrane, the anode comprising a first sheet of metal defining a plurality of open channels to define a plurality of conductive wires and including an anode catalyst, the anode catalyst in contact with the ionomer membrane, the anode, the ionomer membrane, and the cathode being transmissive to a solar radiation spectrum to allow the solar radiation spectrum to irradiate the photovoltaic cell, and when the device is in operation, the solar radiation spectrum passing through the anode, the ionomer membrane, and the cathode before irradiating the photovoltaic cell.

2. The device of claim 1, wherein the photovoltaic cell comprises a triple junction photovoltaic cell.

3. The device of claim 1, wherein the ionomer membrane is operable to transport ions when the device is in operation.

4. The device of claim 1, wherein the ionomer membrane is operable to transport protons when the device is in operation.

5. The device of claim 1, wherein the device does not use an electrolyte to transport ions when the device is in operation.

6. The device of claim 1, further comprising:
   an electrical connection between the anode and the photovoltaic cell.

7. The device of claim 1, wherein the ionomer membrane comprises a sulfonated tetrafluoroethylene based fluoropolymer-copolymer.

8. The device of claim 1, wherein the cathode comprises a second sheet of metal defining a plurality of open channels to define a plurality of conductive wires, and wherein the cathode catalyst is disposed on the plurality of conductive wires.

9. The device of claim 8, wherein the second sheet of metal and the plurality of conductive wires defined by the second sheet of metal are titanium or tantalum, and wherein the cathode catalyst comprises platinum.

10. The device of claim 1, wherein the anode catalyst is disposed on the plurality of conductive wires.

11. The device of claim 1, wherein the first sheet of metal and the plurality of conductive wires defined by the first sheet of metal are titanium or tantalum, and wherein the anode catalyst is selected from a group consisting of nickel, ruthenium, iridium, platinum, and a nickel-iron alloy.

12. The device of claim 1, wherein the ionomer membrane comprises an anion exchange membrane.

13. The device of claim 1, wherein the cathode comprises a gas diffusion electrode.

14. The device of claim 13, wherein the gas diffusion electrode comprises a glass frit, wherein a conductive polymer is disposed on the glass frit, and wherein the cathode catalyst is disposed on the conductive polymer.

15. The device of claim 14, wherein the cathode catalyst is selected from a group consisting of copper, silver, and gold.

16. The device of claim 1, wherein when the device is in operation, a reactant flows through the plurality of open channels and between adjacent conductive wires of the plurality of conductive wires.

\* \* \* \* \*